(12) United States Patent
Hwang et al.

(10) Patent No.: US 8,053,488 B2
(45) Date of Patent: Nov. 8, 2011

(54) AMBIENT TEMPERATURE CURABLE HYDROPHILIC PU OLIGOMER, METHOD FOR SYNTHESIZING THE SAME AND SURFACE TREATMENT METHOD OF USING THE SAME

(75) Inventors: Jing-Zhong Hwang, Taipei Hsien (TW); Shih-Chieh Wang, Taipei Hsien (TW); Po-Cheng Chen, Taipei Hsien (TW); Kan-Nan Chen, Taipei Hsien (TW)

(73) Assignee: Tamkang University, Taipei (TW)

( * ) Notice: Subject to any disclaimer, the term of this patent is extended or adjusted under 35 U.S.C. 154(b) by 802 days.

(21) Appl. No.: 11/969,877

(22) Filed: Jan. 4, 2008

(65) Prior Publication Data

US 2008/0194723 A1 Aug. 14, 2008

(30) Foreign Application Priority Data

Feb. 12, 2007 (TW) ................................ 96104957 A

(51) Int. Cl.
*C08F 2/50* (2006.01)
*C08G 18/10* (2006.01)
*B32B 27/16* (2006.01)
*B32B 27/40* (2006.01)

(52) U.S. Cl. ............. 522/96; 522/97; 522/90; 522/174; 522/74; 522/71; 522/77; 528/44; 528/71; 528/75; 528/76; 524/507; 524/591; 524/839; 524/840; 525/123; 525/127; 525/452; 525/455; 525/457; 525/458; 525/460; 427/388.4; 427/508; 428/423.1

(58) Field of Classification Search ...... 522/90, 522/96, 97, 174, 71, 74, 77; 528/71, 44, 528/75, 76; 524/507, 591, 839, 840; 525/123, 525/127, 452, 455, 457, 458, 460; 427/388.4, 427/508
See application file for complete search history.

(56) References Cited

U.S. PATENT DOCUMENTS

| 4,039,517 | A | * | 8/1977 | Hamamura et al. | 528/45 |
|---|---|---|---|---|---|
| 4,293,679 | A | * | 10/1981 | Cogliano | 528/48 |
| 4,439,552 | A | * | 3/1984 | Dedolph | 521/159 |
| 4,667,661 | A | * | 5/1987 | Scholz et al. | 602/8 |
| 5,189,133 | A | * | 2/1993 | Meixner et al. | 528/49 |
| 5,231,116 | A | * | 7/1993 | Sano et al. | 521/159 |
| 5,391,613 | A | * | 2/1995 | Brindoepke et al. | 524/591 |
| 6,987,135 | B2 | * | 1/2006 | Van Den Berg et al. | 522/97 |
| 2009/0159205 | A1 | * | 6/2009 | Wang | 156/331.4 |

FOREIGN PATENT DOCUMENTS

JP 10218967 A * 8/1998

* cited by examiner

*Primary Examiner* — Sanza McClendon
(74) *Attorney, Agent, or Firm* — Chun-Ming Shih

(57) ABSTRACT

An ambient temperature curable hydrophilic PU oligomer includes a PU pre-polymer having a hydrophilic center group and a curable terminated group. The ambient temperature curable hydrophilic PU oligomer includes the moisture-curable hydrophilic PU oligomer such as isocyanate-terminated PU pre-polymer and free-radical curable hydrophlic PU oligomer. The isocyanate-terminated PU pre-polymer is synthesized by mixing at least one multi-isocyanate, at least one polyol and one or more diol monomer with hydrophilic group. The acrylate-terminated PU oligomer is synthesized by adding 2-hydroxyethyl methacrylate (HEMA) into the isocyanate-terminated hydrophilic PU pre-polymer. Either acrylate- or isocyanate-terminated PU oligomer can be applied on a textile or a glass surface with a thin-layer coating technology. The curing reactions of these hydrophilic thin-layer coatings are carried out with moisture or UV-radiation, respectively, at ambient temperature. These moisture-cured or UV-radiation cured hydrophilic PU coating has water-resistant properties and the hydrophilic characters remain unchanged.

2 Claims, 3 Drawing Sheets

AMBIENT TEMPERATURE CURABLE HYDROPHILIC PU OLIGOMER, METHOD FOR SYNTHESIZING THE SAME AND SURFACE TREATMENT METHOD OF USING THE SAME

BACKGROUND OF THE INVENTION

1. Field of the Invention

This invention relates to hydrophilic materials, particularly, to an ambient temperature curable hydrophilic polyurethane (PU) oligomer, a method for synthesizing the same, and a surface treatment method of using the same.

2. Description of the Related Art

There are lots of natural hydrophilic polymers such as starch, cellulose, dextrin, and artificial hydrophilic polymers such as polyethylene glycols (PEG), poly vinyl alcohol (PVA) and etc. Whatever natural or artificial hydrophilic polymers which mentioned before, when they are used in the surface treatment of a textile or a glass (e.g. a car window or mirror), an adhesion thereof will be lost for contacting the water, even more, dissolved in water. Presently, the hydrophilic modifications of textile surface (e.g. polyester and etc.) are mainly based on modified carbohydrate (e.g. dextrin or starch). It is due to only the van der waals force occurring between hydrophilic polymer(s) and textile surface, the hydrophilicity is temporarily achieved. The hydrophilicity will be lost after several washing cycles by water because the conventional hydrophilic polymers will be swollen when they contact with water, even more, be dissolved in water, thereby the hydrophilicity of textile surface can not be maintained. Especially for color printing ink applications, the poly vinyl alcohol (PVA) is coated on the photo-paper or transparent to enhance the hydrophilicity; but PVA becomes slimy when it contacts with water or moisture, so that the images printed on such photo-paper or transparent are destroyed.

All of problems mentioned above are caused by applying the conventional hydrophilic polymers without water resistance. Therefore, a hydrophilic material overcome the above-mentioned problems is desired.

SUMMARY OF THE INVENTION

An ambient temperature reactive (e.g., curable) hydrophilic PU oligomer includes a PU pre-polymer having a hydrophilic center group and a curable terminated group. The hydrophilic center group is either ionic (e.g. carboxylate, sulfonate and etc.) or non-ionic (e.g. polyethylene glycols and etc). The curable terminated group may be a moisture-curable group (e.g., isocyanate group) or a free-radical curable group (acrylate group). Therefore, the ambient temperature curable hydrophilic PU oligomer includes the moisture-curable hydrophilic PU oligomer such as isocyanate-terminated PU pre-polymer and free-radical curable hydrophlic PU oligomer. A method for synthesizing an ambient temperature curable hydrohilc PU oligomer includes the steps of: mixing at least one multi-isocyanate and at least one polyol to synthesize a hydrophilic PU resin; and introducing curable terminated groups into the hydrophilic PU resin to synthesize an ambient temperature curable hydrohilc PU oligomer. For example, the isocyanate-terminated PU pre-polymer (or named as isocyanate-terminated PU oligomer) is synthesized by mixing at least one multi-isocyanate, at least one polyol and one or more diol monomer with hydrophilic group, thereby obtains the desired isocyanate-terminated PU pre-polymer. The acrylate-terminated PU oligomer is synthesized by adding 2-hydroxyethyl methacrylate (HEMA) into the isocyanate-terminated hydrophilic PU pre-polymer. This isocyanate-terminated hydrophilic PU oligomer is moisture-curable and it results in a formation of moisture-cured hydrophilic PU top coating by exposing to air at ambient temperature. An acrylate-terminated hydrophilic PU oligomer is obtained from an addition of 2-hydroxyethyl methacrylate (HEMA) into the isocyanate-terminated hydrophilic PU oligomer and it results in a formation of free-radical curable hydrophilic PU oligomer, which is cured by an UV-radiation at ambient temperature.

Either acrylate-terminated (UV-curable) or isocyanate-terminated (for moisture-curable) PU oligomer is applied on a textile surface or a glass surface (e.g. car window or mirror) with a thin-layer coating technology (such as spray, dipping, roller, screen printing, and etc). The curing reactions of these hydrophilic thin-layer coatings are carried out with moisture or UV-radiation, respectively, at ambient temperature. These moisture-cured or UV-radiation cured hydrophilic PU coating has water-resistant properties and the hydrophilic characters remain unchanged. The surface contact angle and permeation area can be measured using pure water dropping on the hydrophilic resin treated surface. This measurement proves the function of hydrophilic PU resin on the treated surface before and after water washings.

The present invention is designed for synthesizing functional hydrophilic polymer material which can be cured to form a film. The film is keeping hydrophilic property and insoluble in water at atmospheric temperature. Polyurethane (PU) can be synthesized by different polyisocyanates and polyols. Besides those materials, diol monomers with hydrophilic groups can be added into those materials to produce isocyanate-terminated (NCO-)hydrophilic PU pre-polymer (as shown in Scheme I). The NCO-terminated hydrophilic PU pre-polymer is hydrolyzed with water-vapor to form amine group, then the amine group is cured with other isocyanate functional group. As a result, the PU system becomes a network structure of hydrophilic PU resin (as shown in Scheme II) without losing hydrophilic property.

An acrylate-terminated hydrophilic PU oligomer is obtained from an addition reaction of 2-hydroxyethyl methacrylate (2-HEMA) and hydrophilic PU pre-polymer (as shown in Scheme III). It results in a formation of free-radical curable hydrophilic PU oligomer, which is cured by an UV-radiation at ambient temperature. Reactive diluents such as 1,6-hexanediol diacrylate (HDDA), trimethylolpropane tricarylate (TMPTA) can be used to adjust the viscosity of PU pre-polymer and increase the double-bond concentration of acrylic group. The formula would increase the density of curing/cross-linking. Usefully, enough photo-initiator or photo-sensitizer (about 5% below) is added into the surface of UV-curable PU oligomer. A free-radical polymerization process is performed to form a hydrophilic film via ultraviolet irradiation (as shown in Scheme IV).

The mechanism of UV-curable hydrophilic polyurethane resin forms a network structure via ultraviolet irradiates. The photo-initiator or photo-sensitizer produces free-radical for proceeding free-radical polymerization with double-bond of acrylate in very short time (e.g., about 5 seconds) at atmospheric temperature. The mechanism is formed including four steps: photo-initiation, propagation, transfer and termination reaction etc.

The contact angle of water drops on the surface means that the wettability of the surface treated with hydrophilic polyurethane resin. If the contact angle approaches zero degree, it means water drops on the surface can be spread easily and quickly.

In this invention, the carboxylic acid group and sulfonate group etc. individually, is used and mixed with polyethylene glycols (PEG-2000) or Polypropylene glycols (PPG-2000) to be an internal emulsifier for hydrophilic polyurethane pre-polymer, (e.g. as shown in Scheme I).

In this invention, the reactive hydrophilic PU can be used for coating on different clothes and glass. The reactive hydrophilic PU resin can also be used for coating on different textiles surface, fibers surface (e.g. polyester, polyether, and etc.) and glass surface. The curing-density of PU system increases after adding reactive diluents, polyisocyanates (e.g. toluene diisocyanates, TDI; isophorone diisocyanate, IPDI; and etc.) and acrylate monomer (e.g. trimethylolpropane triacrylate, TMPTA; and etc.). The reactive hydrophilic PU resin well combines with textiles and embeds in fibers after moisture-curing or UV-curing at ambient temperature. The surface of treated textiles and fibers owns water-resistant properties and the hydrophilic characters remain the same simultaneously (as shown in Scheme IV).

In this invention, a mixture of the silane coupling agent and the reactive hydrophilic PU system is used for coating on glass. The curing-density of PU system increases on glass surface after moisture-curing or UV-curing at ambient temperature. The surface of treated glass owns water-resistant properties and the hydrophilic characters remain the same simultaneously.

DETAILED DESCRIPTION OF THE INVENTION

Synthesis of Moisture-curing Type PU Pre-polymer

Figure 1:
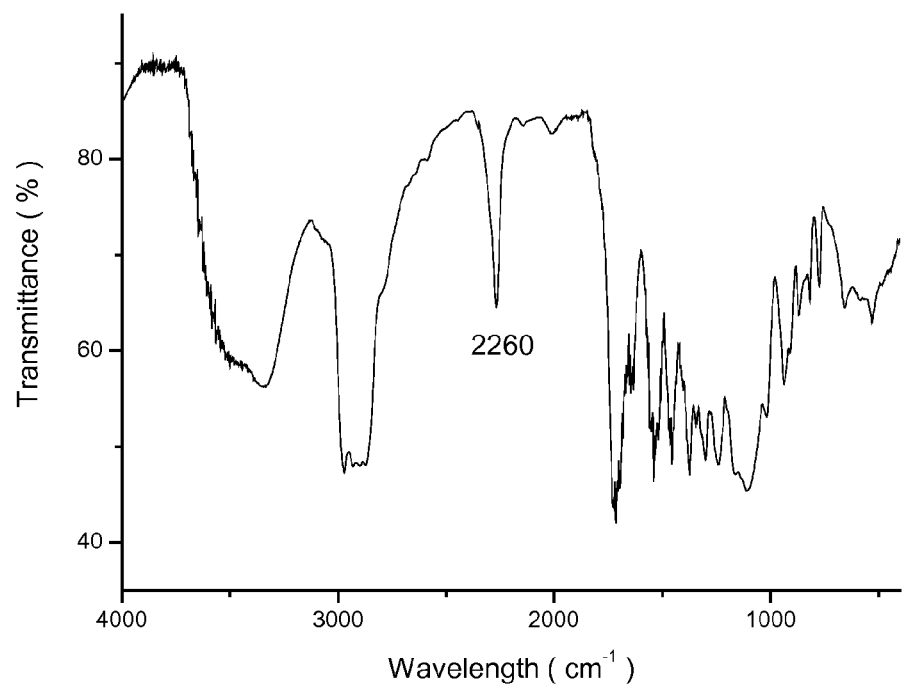
FIG. 1 shows a FT-IR spectrum of PU-COOH.

The NCO-terminated reactive PU pre-polymer is synthesized by different polyisocyanates and diols (as shown in Scheme I). The carboxylic-type PU pre-polymer is synthesized by IPDI, PEG and DMPA; the sulfonate-type PU pre-polymer is synthesized by IPDI, PEG and DS-200; the non-ionic-type PU pre-polymer is synthesized by TDI and PEG; and other type PU systems are provided (as shown in Scheme I). Then, a NCO value of each of the above PU pre-polymers is measured by the NCO titration method (i.e., ASTM D1638 NCO determination method). Then a peak of -NCO group of each of the above PU pre-polymers is measured by FT-IR instrument. The peak of -NCO group at about 2260 cm$^{-1}$ is found. Thus, it is proved that the PU pre-polymer is successfully synthesized.

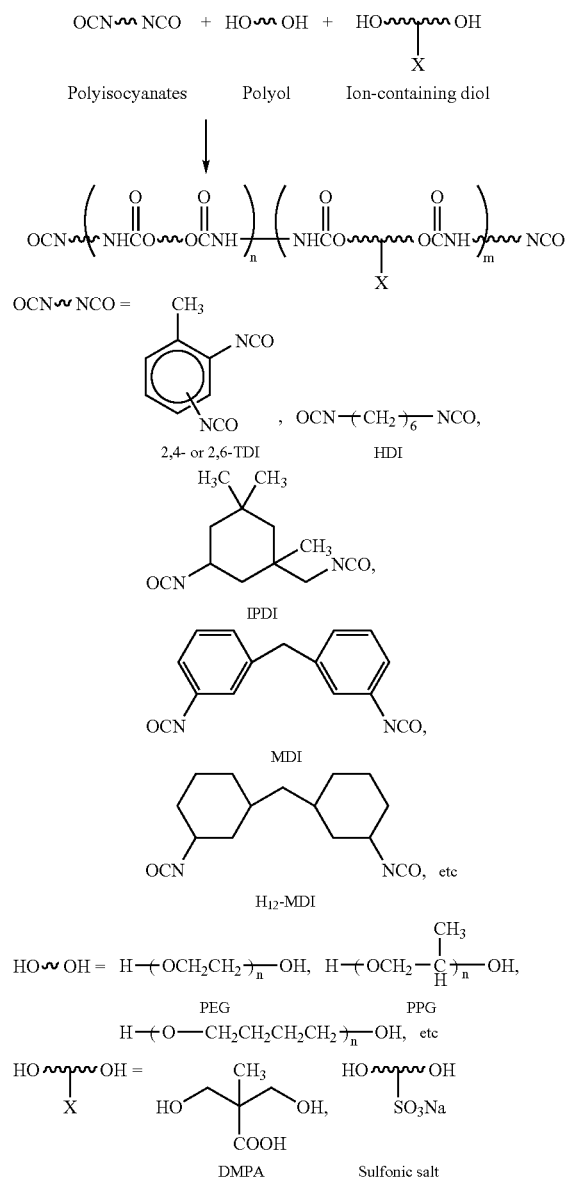

Moisture Curing Reaction

Textiles are dipped into carboxyl-type and sulfonate-type PU solutions, and slung in the air. During air drying, the NCO-terminated PU becomes amine-terminated PU by moisture curing reaction. The hydrophilic PU pre-polymer hydrolyzes with water-vapor, and then amine groups react with other isocyanate functional groups to form urea groups. The PU system becomes a network structure of hydrophilic PU resin, and the hydrophilic characters remains the same simultaneously (as shown in Scheme II).

Scheme II Moisture Curing Reaction

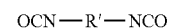

Diisocyanate monomer

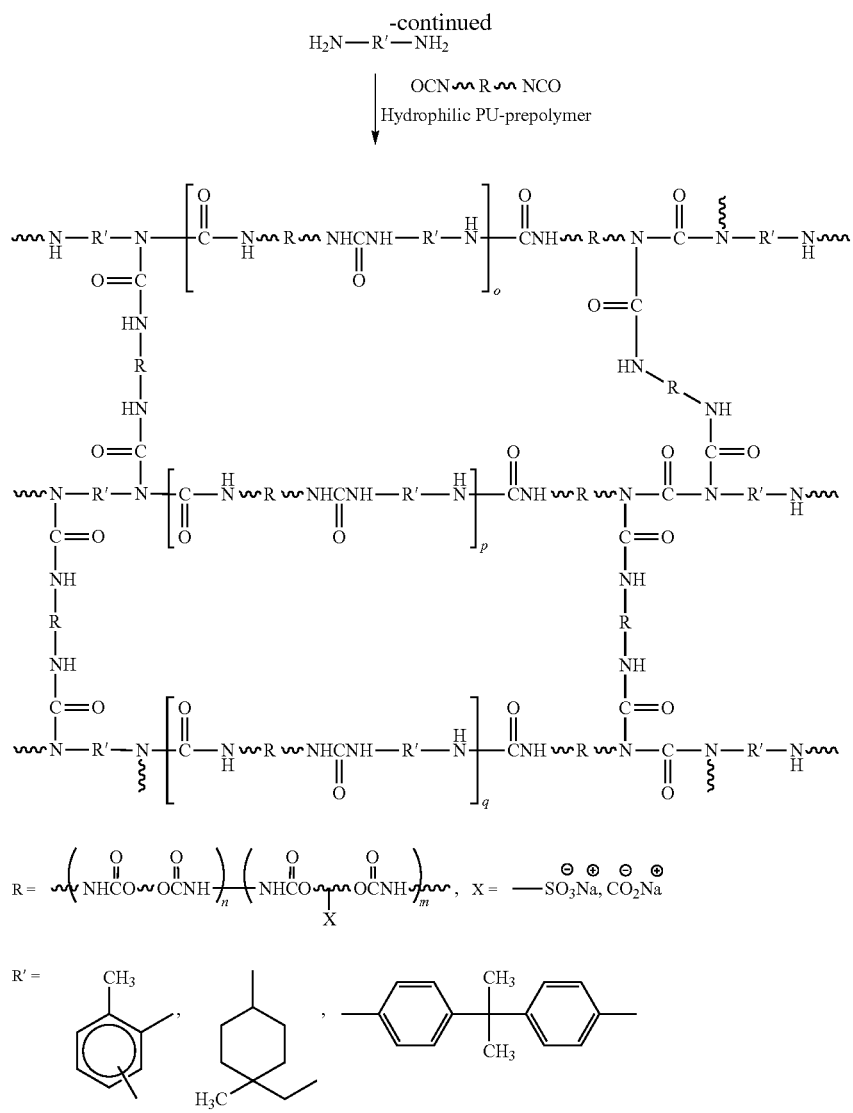

Synthesis of Acrylate-terminated UV-PU Oligomer

An acrylate-terminated hydrophilic PU oligomer is obtained from an addition of excess 2-hydroxyethyl methacrylate (HEMA) and it results in a formation of free-radical curable hydrophilic PU oligomer (as shown in Scheme III). The PU oligomer is cured by an UV-radiation at ambient temperature. During the addition reaction, an appropriate of catalyst (e.g. DBTDL) can be added or not. Finally, the disappearance of the NCO peak of the UV-PU oligmer is proved by FT-IR instrument.

Scheme III Synthesis of acrylate-terminate UV-PU oligomer

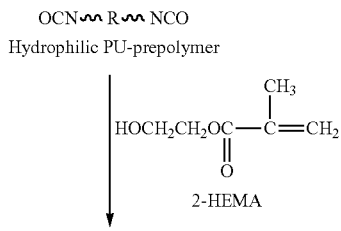

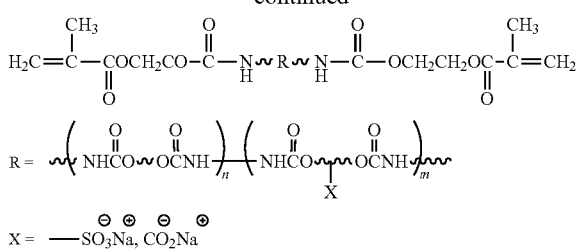

Electron Beam Radiation Curing Reaction and UV-Curing Reaction

The textiles are dipped into UV-PU solutions including photo-initiator (e.g. benzoin alkyl ether, 1173) or photo-sensitizer (e.g. benzophenone, BP), and are slung in the air. After air drying, the textiles are irradiated by an ultraviolet instrument or electron-beams. The PU system of the textiles becomes a network structure of hydrophilic PU resin, but the hydrophilic characters remained the same (as shown in Scheme IV).

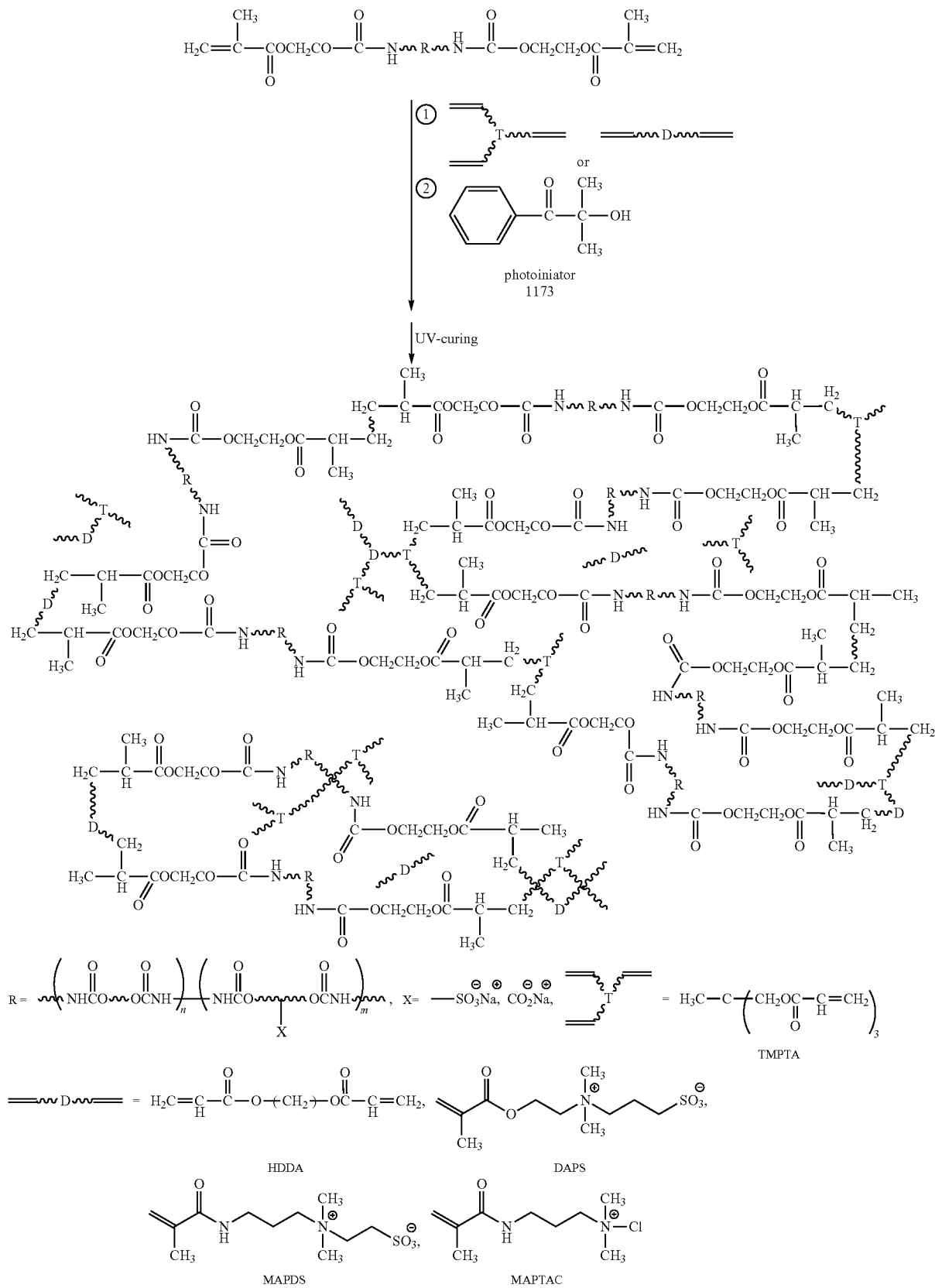

Application of an Aqueous-based UV-PU Resin Including Hydrophilic Sufonate-acrylate Monomer An aqueous-based UV-PU solution including sufonate-acrylate monomer (e.g. DAPS; MAPDS; MAPTAC and etc.) and photo-initiator (e.g. benzoin alkyl ether, 1173) or photo-sensitizer (e.g. benzophenone, BP) are prepared (as shown in Scheme IV). The textiles are dipped into UV-PU solutions, and slung in the air. After air drying, the textiles are irradiated by an ultraviolet instrument or electron-beams. The PU system of the textiles becomes a network structure of hydrophilic PU resin, but the hydrophilic characters remained the same (as shown in Scheme IV).

Application of Silane Coupling Agent on Glass Surface

Reactive hydrophilic-silanes are chosen to be coupling agents (e.g. tetraethoxysilane, TEOS; vinyl Triethoxysilane, VTES; and etc.) for PU system and glass surfaces. The coupling agents make PU system and glass surface bound more closely via moisture-curing. Ultraviolet instrument or electron-beam is used to irradiate the glass. The PU system of the glass surface becomes a network structure of hydrophilic PU resin. The layer on the glass can provide a nice anti-fog result and a durable material. This anti-fog reagent is better than other products on the market.

The Surface of Textiles Activated Treated with Sodium Hydroxide:

The textiles are coated with the ionic type hydrophilic UV-curable PU oligomers, and are slung in the air. After air drying, the ultraviolet instrument or electron-beam is used to irradiate the textiles. The PU system of the textiles becomes a network structure of hydrophilic PU resin (as shown in Scheme IV). The textiles are dipped into a low concentration sodium hydroxide solution. The carboxylic acid group is activated and neutralized with sodium hydroxide solution. The contact angle on the textiles decrease after treated with PU resin and sodium hydroxide. The layer on the textiles can provide a nice super-hydrophilic result and a durable material. The treated textiles are better than other products on the market.

The following examples serve to illustrate the preferred embodiments of the present invention but the present invention is not introduced to be limited to the details thereof.

Synthesis Carboxylic-type PU Pre-polymer (PU-COOH)

A carboxylic-type PU pre-polymer (called PU-COOH) is synthesized by IPDI, PPG-1000 and DMPA under nitrogen environment (as shown in Scheme I). The temperature of additional-polymerization is kept at 100 degrees Celsius. A NCO value is measured by the NCO titration method (i.e., ASTM D1638 NCO determination method). The peak of -NCO group at about 2260 $cm^{-1}$ is found in the FT-IR figure (as shown in FIG. 1). Thus, it is proved that the PU pre-polymer is successfully synthesized.

Synthesis Sulfonate-type PU Pre-polymer (PU-SO$_3$Na)

Figure 2:
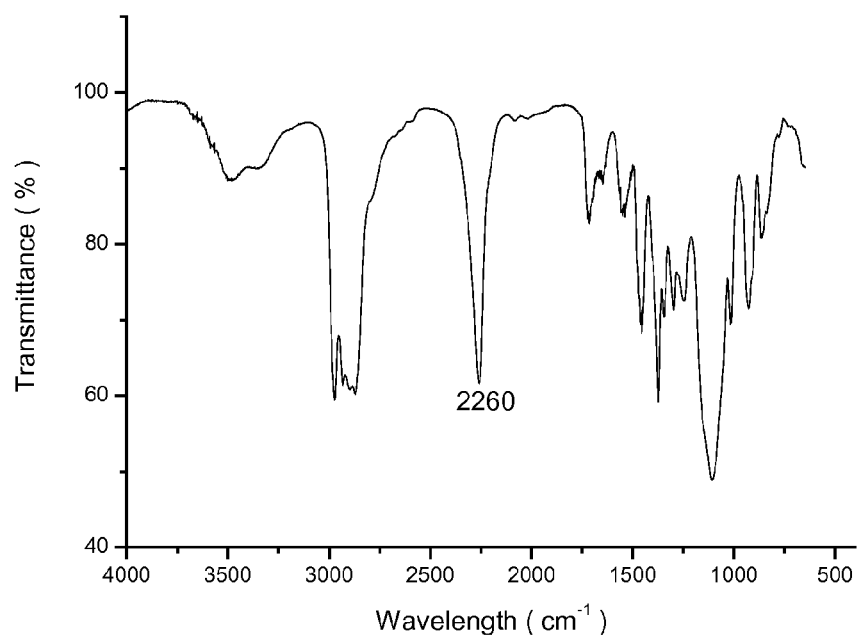
FIG. 2 shows a FT-IR spectrum of PU-SO$_3$Na.

The sulfonate-type PU pre-polymer (called PU-SO$_3$Na) is synthesized by IPDI, PEG-1000 and DS-200 under nitrogen (as shown in Scheme I). The temperature of additional-polymerization is kept at 100 degrees Celsius. The NCO value is measured by the NCO titration (ASTM D1638 NCO determination method). The peak of -NCO group at about 2260 $cm^{-1}$ is found in the FT-IR figure (as shown in FIG. 2). Thus, it is proved that the sulfonate-type PU pre-polymer is successfully synthesized.

Synthesis Nonionic-type PU Pre-polymer (PU-PEG)

Figure 3:
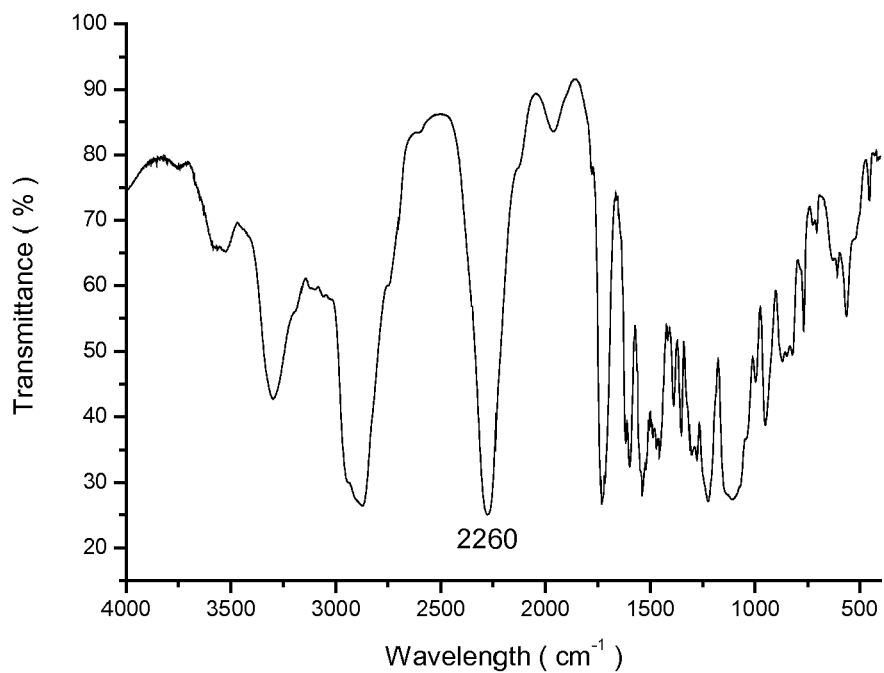
FIG. 3 shows a FT-IR spectrum of PU-PEG

The nonionic-type PU pre-polymer (called PU-PEG) is synthesized by TDI and PEG-1000 under nitrogen (as shown in Scheme I). The temperature of additional-polymerization is kept at 100 degrees Celsius. The NCO value is measured by the NCO titration (i.e., ASTM D1638 NCO determination method). The peak of -NCO group at about 2260 $cm^{-1}$ is found in the FT-IR figure (as shown in FIG. 3). Thus, it is proved that the nonionic-type PU pre-polymer is successfully synthesized.

Preparation of Acrylate-terminated Carboxylic-type PU Oligomer (UV-PU-COOH)

Figure 4:
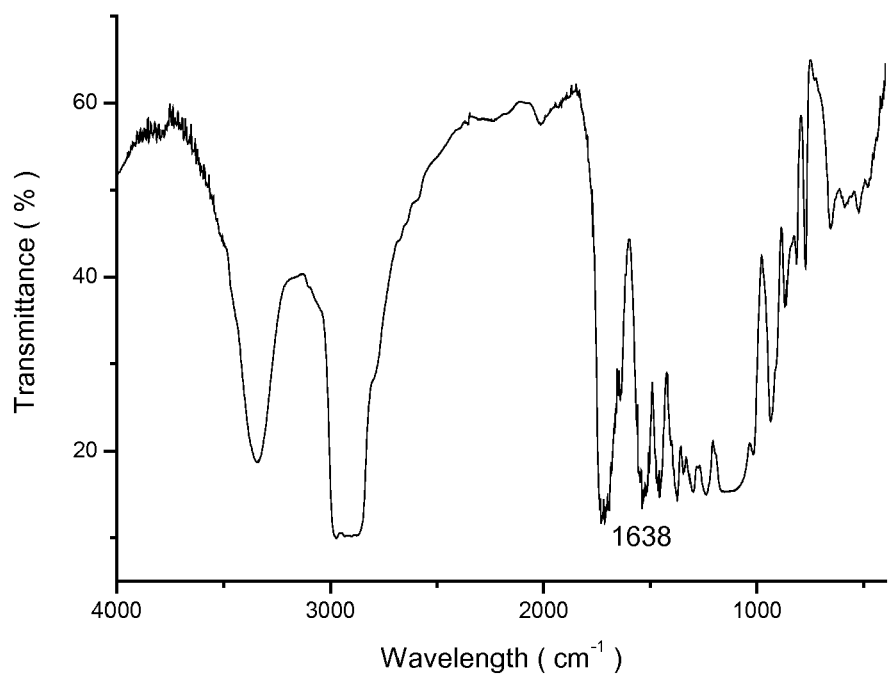
FIG. 4 shows a FT-IR spectrum of UV-PU-COOH.

The process of carboxylic-type PU pre-polymer is similar to PU-COOH. A solvent can be added or not to adjust viscosity. An acrylate-terminated hydrophilic PU oligomer is obtained from an addition of excess 2-hydroxyethyl methacrylate (2-HEMA) monomers. The PU pre-polymer results in a formation of free-radical curable hydrophilic PU oligomer (called UV-PU-COOH) which is cured by an UV-radiation at ambient temperature (as shown in Scheme III). During the addition reaction, an appropriate of a catalyst (e.g. DBTDL) can be added or not. When the NCO peak of UV-PU oligmer disappears and the peak of acrylic double bond occurs at 1638 $cm^{-1}$ by FT-IR instrument, it is proved that the acrylate-terminated hydrophilic PU oligomer is successfully synthesized (as shown in FIG. 4).

Preparation of Acrylate-terminated Sulfonated-type PU Oligomer (UV-PU-SO$_3$Na)

Figure 5:
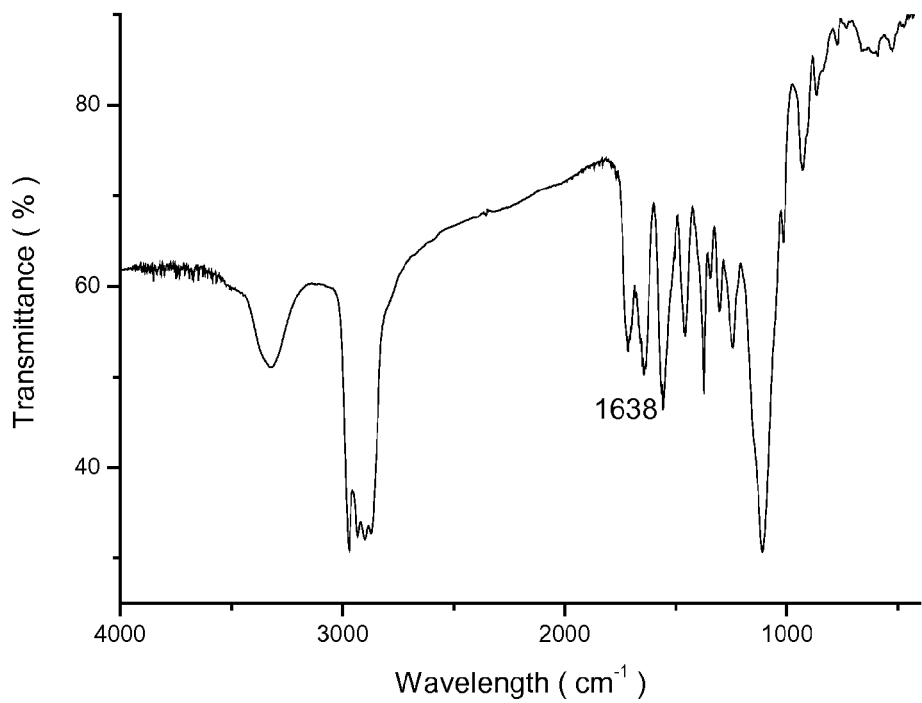
FIG. 5 shows a FT-IR spectrum of UV-PU-SO3Na.

The process of sulfonated-type PU pre-polymer is similar to PU-SO$_3$Na. A solvent can be added or not to adjust viscosity. An acrylate-terminated hydrophilic PU oligomer is obtained from an addition of excess 2-hydroxyethyl methacrylate (2-HEMA) monomers. The PU pre-polymer results in a formation of free-radical curable hydrophilic PU oligomer (called UV-PU-SO$_3$Na), which is curable by an UV-radiation at ambient temperature (as shown in Scheme III). During the addition reaction, an appropriate of a catalyst (e.g. DBTDL) can be added or not. When the NCO peak of UV-PU oligmer disappears and the peak of acrylic double bond occurs at 1638 $cm^{-1}$ by FT-IR instrument, it is proved that the acrylate-terminated sulfonated-type PU oligomer is successfully synthesized (FIG. 5).

Preparation of Acrylate-terminated Nonionic-type PU Oligomer (UV-PU-PEG)

Figure 6:
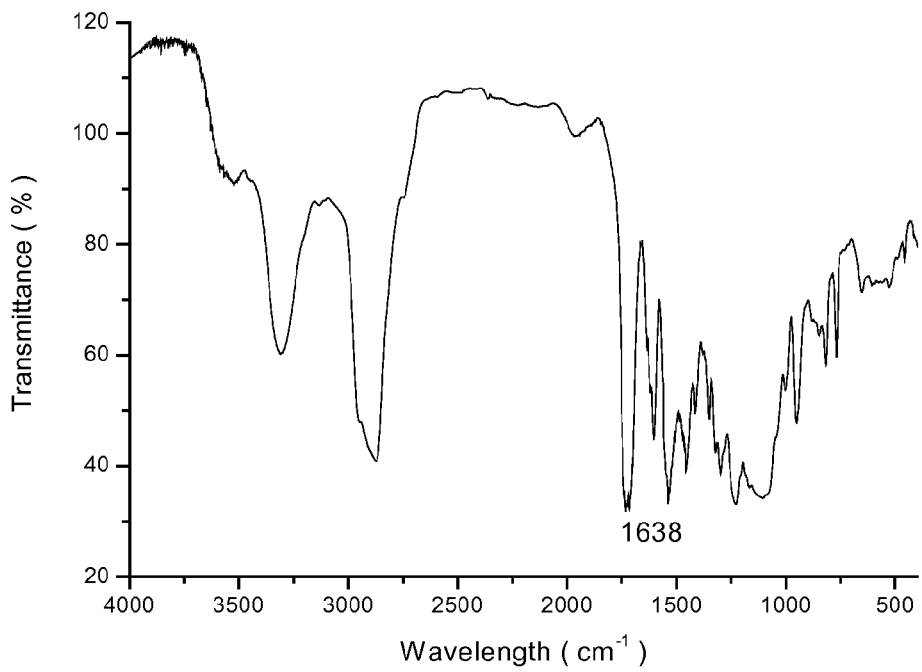
FIG. 6 shows a FT-IR spectrum of UV-PU-PEG

The process of nonionic-type PU pre-polymer is similar to PU-PEG A solvent can be added or not to adjust viscosity. An acrylate-terminated hydrophilic PU oligomer is obtained from an addition of excess 2-hydroxyethyl methacrylate (2-HEMA) monomers. The PU pre-polymer results in a formation of free-radical curable hydrophilic PU oligomer (called UV-PU-PEG), which is curable by an UV-radiation at ambient temperature (as shown in Scheme III). During the addition reaction, an appropriate of a catalyst (e.g. DBTDL) can be added or not. When the NCO peak of UV-PU oligmer disappears and the peak of acrylic double bond occurs at 1638 $cm^{-1}$ by FT-IR instrument, it is proved that the acrylate-terminated nonionic-type PU oligomer is successfully synthesized (as shown in FIG. 6).

Preparation of Aqueous-based Carboxylic-type UV-PU Oligomer (UV-WPU-COOH)

The process of preparing the UV-curable aqueous-based carboxylic-type PU is similar to that of the UV-PU-COOH. A tri-ethyl amine (TEA) is added to neutralize carboxylic acid with high-speed stirring. The neutralized UV-PU solution is dropped into de-ion water, a volume of the de-ion water is ten times or more than that of the UV-PU-COOH. The high-speed stirring causes the UV-PU oligomer forming micelle and dispersing into the de-ion water. As a result the desired UV-WPU-COOH is formed.

Preparation of Aqueous-based Sulfonate-type UV-PU Oligomer (UV-WPU-SO$_3$Na)

The process of preparing UV-PU-SO$_3$Na oligomer is similar to that of the UV-PU-SO$_3$Na. The UV-curable sulfonate-type PU oligomer is dropped into a de-ion water with high-speed stirring. The volume of de-ion water is ten times or more than that of the UV-PU-SO$_3$Na. The high-speed stirring can cause the UV-PU oligomer forming micelle and dispersing into the de-ion water. As a result the desired UV-WPU-SO$_3$Na is formed.

Preparation of Aqueous-based Nonionic-type UV-PU Oligomer (UV-WPU-PEG)

The process of preparing the UV-curable nonionic-type PU is similar to that of the UV-PU-PEG The UV-curable non-ionic-type PU oligomer is dropped into de-ion water with high-speed stirring. The volume of de-ion water is ten times or more than that of the UV-PU-PEG The high-speed stirring can cause the UV-PU oligomer forming micelle and dispersing into the de-ion water. As a result the desired the UV-WPU-PEG is formed.

Preparation of Carboxylic-type Anti-fog Agent for Glass Coating

A solvent is added to adjust the viscosity of UV-PU-COOH, and a vinyl triethoxysilane (VTES) with 20 phr (i.e., per hundred resin, or a proportion of the VTES to the UV-PU-COOH being 20 percent by weight) is dropped into the UV-PU-COOH solution with stirring at atmospheric temperature. The VTES is a coupling agent between UV-PU-COOH and glass. During stirring, reactive-diluents (e.g. TMPTA, HDDA and etc.) can be added or not to adjust viscosity.

Preparation of Sulfonate-type Anti-fog Agent for Glass Coating

A solvent is added to adjust the viscosity of UV-PU-SO$_3$Na, and the VTES with 20 phr (per hundred resin) is dropped into UV-PU-SO$_3$Na solution with stirring at atmospheric temperature. The VTES is a coupling agent between UV-PU-SO$_3$Na and glass. During stirring, reactive-diluents (e.g. TMPTA, HDDA and etc.) can be added or not to adjust viscosity.

Preparation of Nonionic-type Anti-fog Agent for Glass Coating

A solvent is added to adjust the viscosity of UV-PU-PEG, and the VTES with 20 phr (per hundred resin) is dropped into UV-PU-PEG solution with stirring at atmospheric temperature. The VTES is a coupling agent between UV-PU-PEG and glass. During stirring, reactive-diluents (e.g. TMPTA, HDDA and etc.) can be added or not to adjust viscosity.

EXAMPLE 1

Preparation of Carboxylic-type Super-hydrophilic Textiles via Moisture Curing

The textiles are dipped into PU-COOH solutions, and then are slung in the air. During air drying, the PU-COOH system becomes a network structure via moisture curing reaction (as shown in Scheme II). But the hydrophilic character of hydrophilic PU resin remains unchanged.

EXAMPLE 2

Preparation of Sulfonate-type Super-hydrophilic Textiles via Moisture Curing

The PU-SO$_3$Na is substituted for PU-COOH and the rest of reaction procedures are similar to Example 1. But the hydrophilic character of the hydrophilic PU resin remains unchanged.

EXAMPLE 3

Preparation of Nonionic-type Super-hydrophilic Textiles via Moisture Curing

The PU-PEG is substituted for PU-COOH and the rest of reaction procedures are similar to Example 1. But the hydrophilic character of hydrophilic PU resin remains unchanged.

EXAMPLE 4

Preparation of Carboxylic-type Super-hydrophilic Textiles via Ultraviolet Instrument Irradiating The textiles are dipped into UV-WPU-COOH solutions including 5 phr photo-initiator (e.g. benzoin alkyl ether, 1173), and then are slung in the air. After air drying, the ultraviolet instrument is used to irradiate the textiles. The PU system of the textiles became a network structure of hydrophilic PU resin, but the hydrophilic character remains unchanged (as shown in Scheme IV).

EXAMPLE 5

Preparation of Sulfonate-type Super-hydrophilic Textiles via Ultraviolet Instrument Irradiating The UV-WPU-SO$_3$Na is substituted for UV-WPU-COOH and the rest of reaction procedures are similar to Example 4. But the hydrophilic character of hydrophilic PU resin remains unchanged.

EXAMPLE 6

Preparation of Nonionic-type Super-hydrophilic Textiles via Ultraviolet Instrument Irradiating The UV-WPU-PEG is substituted for UV-WPU-COOH and the rest of reaction procedures are similar to Example 4. But the hydrophilic character of hydrophilic PU resin remains unchanged.

EXAMPLE 7

Preparation of Super-hydrophilic Textiles Including Sufonate-acrylate Monomer via Ultraviolet Instrument Irradiating An aqueous-based UV-PU solution including 5 phr photo-initiator and sufonate-acrylate monomer (e.g. DAPS; MAPDS; MAPTAC and etc.) are prepared. The textiles are dipped into the UV-WPU-COOH solutions, and then are slung in the air. After air drying, the ultraviolet instrument is used to irradiate the textiles. The PU system of the textiles becomes a network structure of hydrophilic PU resin, but the hydrophilic character remains unchanged (as shown in Scheme IV).

EXAMPLE 8

Preparation of Super-hydrophilic Textiles Including Sufonate-acrylate Monomer via Ultraviolet Instrument Irradiating The UV-WPU-SO$_3$Na is substituted for UV-WPU-COOH and the rest of reaction procedures are similar to Example 7. But the hydrophilic character of hydrophilic PU resin remains unchanged.

EXAMPLE 9

Preparation of Super-hydrophilic Textiles Including Sufonate-acrylate Monomer via Ultraviolet Instrument Irradiating The UV-WPU-PEG is substituted for UV-WPU-COOH and the rest of reaction procedures are similar to Example 7. But the hydrophilic character of hydrophilic PU resin remains unchanged.

EXAMPLE 10

Preparation of Carboxylic-type Super-hydrophilic Textiles via Electron Beam Irradiating The textiles are dipped into UV-WPU-COOH solutions and then are slung in the air. After air drying, the electron-beam is used to irradiate to the textiles. The PU system of the textiles becomes a network structure of hydrophilic PU resin, but the hydrophilic character remains unchanged (as shown in Scheme IV).

EXAMPLE 11

Preparation of Sulfonate-type Super-hydrophilic Textiles via Electron Beam Irradiating The UV-WPU-SO$_3$Na is substituted for UV-WPU-COOH and the rest of reaction procedures are similar to Example 10. But the hydrophilic character of hydrophilic PU resin remains unchanged.

EXAMPLE 12

Preparation of Nonionic-type Super-hydrophilic Textiles via Electron Beam Irradiating The UV-WPU-PEG is substituted for UV-WPU-COOH and the rest of reaction procedures are similar to Example 10. But the hydrophilic character of hydrophilic PU resin remains unchanged.

EXAMPLE 13

Preparation of Super-hydrophilic Textiles Including Sufonate-acrylate Monomer via Electron Beam Irradiating An aqueous-based UV-PU solution including sufonate-acrylate monomer (e.g. DAPS; MAPDS; MAPTAC and etc.) is prepared. The textiles are dipped into UV-WPU-COOH solutions, and then are slung in the air. After air drying, the electron beam is used to irradiate to the textiles. The PU system of the textiles becomes a network structure of hydrophilic PU resin, but the hydrophilic character remains unchanged (as shown in Scheme IV).

EXAMPLE 14

Preparation of Super-hydrophilic Textiles Including Sufonate-acrylate Monomer via Electron Beam Irradiating The UV-WPU-SO$_3$Na is substituted for UV-WPU-COOH and the rest of reaction procedures are similar to Example 13. But the hydrophilic character of hydrophilic PU resin remains unchanged.

EXAMPLE 15

Preparation of Super-hydrophilic Textiles Including Sufonate-acrylate Monomer via Electron Beam Irradiating The UV-WPU-PEG is substituted for UV-WPU-COOH and the rest of reaction procedures are similar to Example 13. But the hydrophilic character of hydrophilic PU resin remains unchanged.

EXAMPLE 16

Preparation of Carboxylic-type Anti-fog Agent for Glass Coating via Ultraviolet Instrument Irradiating The 20 phr VTES is dipped into an UV-PU-COOH solution including 5 phr photo-initiator with stirring at atmospheric temperature, and then the formed solution is coated on glass. After air drying, the ultraviolet instrument is used to irradiate the glass. The VTES is a coupling agent between UV-PU-COOH and glass. The UV-PU-COOH adheres to glass closely, but the hydrophilic character of hydrophilic PU resin remains unchanged.

EXAMPLE 17

Preparation of Sulfonate-type Anti-fog Agent for Glass Coating via Ultraviolet Instrument Irradiating The UV-PU-SO$_3$Na is substituted UV-PU-COOH and the rest of reaction procedures are similar to Example 16. The VTES is a coupling agent between UV-PU-SO$_3$Na and glass. The UV-PU-SO$_3$Na adheres to glass closely, but the hydrophilic character of hydrophilic PU resin remains unchanged.

EXAMPLE 18

Preparation of Nonionic-type Anti-fog Agent for Glass Coating via Ultraviolet Instrument Irradiating The UV-PU-PEG is substituted for UV-PU-COOH and the rest of reaction procedures are similar to Example 16. The VTES is a coupling agent between UV-PU-PEG and glass. The UV-PU-PEG adheres to glass closely, but the hydrophilic character of hydrophilic PU resin remains unchanged.

EXAMPLE 19

Preparation of Carboxylic-type Anti-fog Agent for Glass Coating via Electron Beam Irradiating The 20 phr VTES is dipped into an UV-PU-COOH solution with stirring at atmospheric temperature, and then the formed solution is coated on glass. After air drying, the electron beam is used to irradiate the glass. The VTES is a coupling agent between UV-PU-COOH and glass. The UV-PU-COOH adheres to glass closely, but the hydrophilic character of hydrophilic PU resin remains unchanged.

EXAMPLE 20

Preparation of Sulfonate-type Anti-fog Agent for Glass Coating via Electron Beam Irradiating The UV-PU-SO$_3$Na is substituted for UV-PU-COOH and the rest of reaction procedures are similar to Example 19. The VTES is a coupling agent between UV-PU-SO$_3$Na and glass. The UV-PU-SO$_3$Na adheres to glass closely, but the hydrophilic character of hydrophilic PU resin remains unchanged.

EXAMPLE 21

Preparation of Nonionic-type Anti-fog Agent for Glass Coating via Electron Beam Irradiating The UV-PU-PEG is substituted for UV-PU-COOH and the rest of reaction procedures are similar to Example 19. The VTES is a coupling agent between UV-PU-PEG and glass.

The UV-PU-PEG adheres to glass closely, but the hydrophilic character of hydrophilic PU resin remains unchanged.

EXAMPLE 22

The Surface of Textiles Activated Treated with Sodium Hydroxide

The textiles from example 1 are dipped into a low concentration sodium hydroxide solution. The carboxylic acid group is activated and neutralized with sodium hydroxide solution. The contact angle on the textiles decrease after treated with PU resin and sodium hydroxide. The layer on the textiles can provide a nice super-hydrophilic result and a durable material. The treated textiles are better than other products on the market.

EXAMPLE 23

The Surface of Textiles Activated Treated with Sodium Hydroxide

The textiles from example 4 are substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

EXAMPLE 24

The Surface of Textiles Activated Treated with Sodium Hydroxide

The textiles from example 7 are substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

EXAMPLE 25

The Surface of Textiles Activated Treated with Sodium Hydroxide

The textiles from example 10 are substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

EXAMPLE 26

The Surface of Textiles Activated Treated with Sodium Hydroxide

The textiles from example 13 are substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

EXAMPLE 27

The Surface of Textiles Activated Treated with Sodium Hydroxide

The glass from example 16 is substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

EXAMPLE 28

The Surface of Textiles Activated Treated with Sodium Hydroxide

The textiles from example 19 are substituted for textiles from example 1 and the rest of reaction procedures are similar to Example 22. The carboxylic acid group is activated and neutralized with sodium hydroxide solution. The layer on the textiles can provide a nice super-hydrophilic result and a durable material.

What is claimed is:

1. A surface treatment method using ambient temperature curable hydrophilic PU oligomer, comprising the steps of:
    providing a material comprised one of a textile and a glass, the material having a surface to be treated;
    forming an ambient temperature curable hydrohilc PU oligomer on the surface of the material; and
    curing the ambient temperature curable hydrohilc PU oligomer on the surface of the material,
    when the ambient temperature curable hydrohilc PU oligomer is an acrylate-terminated hydrophilic PU oligomer, and the curing process comprises the steps of: using UV-radiation irradiating the acrylate-terminated hydrophilic PU oligomer formed on the surface of the material, thereby obtaining an acrylate-terminated hydrophilic PU film on the surface of the material,
    wherein adding a reactive diluent into the acrylate-terminated hydrophilic PU oligomer before the acrylate-terminated hydrophilic PU oligomer being formed on the surface of the material, adding a photo-initiator or a photo-sensitizer with 5% by volume or below into the acrylate-terminated hydrophilic PU oligomer before the acrylate-terminated hydrophilic PU oligomer being formed on the surface of the material, and adding a coupling agent into the acrylate-terminated hydrophilic PU oligomer before the acrylate-terminated hydrophilic PU oligomer being formed on the surface of the material, and
    wherein the coupling agent is one of TEOS and VTES with 20 phr.

2. The method as claimed in claim 1, wherein the reactive diluent is one of HDDA and TMPTA.

* * * * *